Dec. 11, 1951     T. G. POCCI     2,578,149
PORTABLE CYLINDER GRINDING TOOL
Filed Aug. 6, 1948
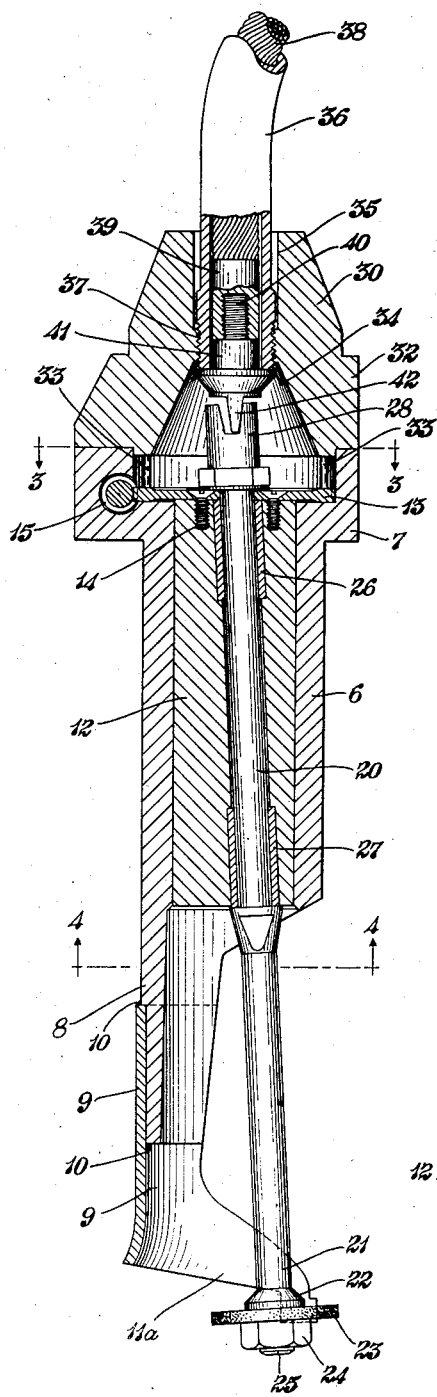
Fig. 1
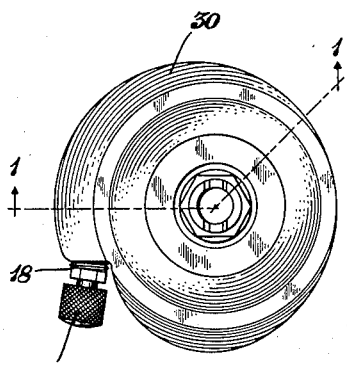
Fig. 2
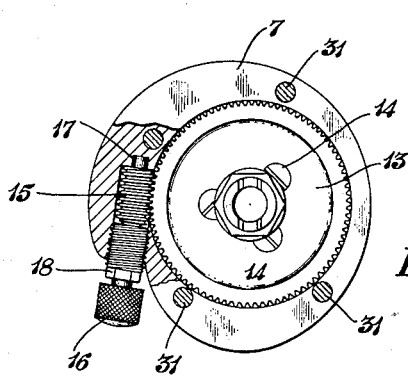
Fig. 3
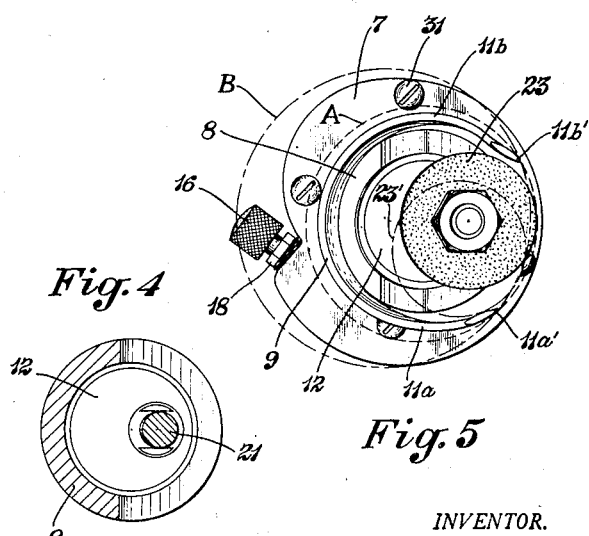
Fig. 4
Fig. 5
INVENTOR.
Tebaldo G. Pocci
BY
ATTORNEYS Patented Dec. 11, 1951

2,578,149

UNITED STATES PATENT OFFICE 2,578,149

PORTABLE CYLINDER GRINDING TOOL

Tebaldo G. Pocci, Canton, Ohio

Application August 6, 1948, Serial No. 42,762

2 Claims. (Cl. 51—170)

The invention relates generally to tools for grinding the cylinders of internal combustion engines and more particularly to a portable grinding tool which is adapted accurately to grind off spots or defects in the cylinders, and is adjustable for grinding cylinders of various diameters.

In the manufacture of engine blocks, spot defects in the cylinder walls must be ground off, and these spots occur when, for example, a cylinder block has been cast and has gas holes or blow holes which occur at the interior surface of a cylinder. Such holes are plugged with weld metal and the surface of the weld metal must then be ground off to leave a true cylindrical surface.

Prior grinding machines for grinding or reboring cylinders are adapted for grinding the whole interior wall of the cylinder but are not suitable for grinding off such spots at random locations.

Ordinarily, such spots are ground off by a hand grinding tool which has a power driven grinding wheel on the outer end of a projecting spindle and the wheel is inserted into the cylinder and held against the spot by the operator until the weld metal is ground off. The accuracy of the grinding operation is thus dependent upon the skill of the operator, and if he grinds too deeply, the adjoining surface of the cylinder is scored or grooved and cannot be satisfactorily repaired. The result is that it is common practice to scrap considerable numbers of cylinder blocks which have been ruined because the spot defects have been improperly ground.

It is a general object of the present invention to provide a novel portable cylinder grinding tool which overcomes the disadvantages of prior tools.

A more specific object is to provide a novel portable grinding tool which is adapted to grind off spot defects in a cylinder without injuring the adjoining surfaces of the cylinder.

Another object is to provide a novel portable grinding tool which is easily adjustable to fit a variety of sizes of cylinders.

A further object is to provide a novel portable grinding tool which has a power driven grinding wheel on the end of a projecting spindle and guide elements located adjacent the wheel for accurately positioning the wheel with respect to the cylindrical surface being ground.

A still further object is to provide a novel portable cylinder grinding tool in which the grinding wheel spindle is solidly mounted in axially spaced bearings.

Finally, it is an object of the present invention to provide a novel and improved portable cylinder grinding tool which is simple, compact and inexpensive to manufacture, and which can be safely used without requiring more than ordinary skill of the operator.

These and other objects are accomplished by the parts, constructions, arrangements, and combinations which comprise the present invention, the nature of which is set forth in the following general statement, and a preferred embodiment of which is set forth in the following description and illustrated in the accompanying drawings, and which is particularly and distinctly pointed out and set forth in the appended claims forming part hereof.

In general terms, the portable cylinder grinding tool of the present invention includes an elongated bearing block rotatably mounted in a cylindrical housing, with a worm gear secured to one end of the block and a worm on the housing meshing with the worm gear for rotatably adjusting the block in the housing, the grinding wheel spindle being journaled in the block out of axial alignment therewith and having a projecting outer end with the grinding wheel secured thereon, there being a guide element extending outward from the housing and located adjacent to the grinding wheel to guide the wheel against the cylinder surface, whereby rotatable adjustment of the block will move the wheel toward and away from the guide element to position the wheel for different sizes of cylinders, and cable drive means having a universal driving connection with said spindle.

Referring to the drawing forming part hereof, in which a preferred embodiment of the grinding tool is shown by way of example;

Figure 1 is a longitudinal sectional view of the improved tool as on line 1—1, Fig. 2;

Fig. 2 is an end elevation of the upper end of said tool with the grinding cable removed;

Fig. 3 is a transverse sectional view substantially on line 3—3, Fig. 1, with parts broken away;

Fig. 4 is a transverse sectional view as on line 4—4, Fig. 1; and

Fig. 5 is a bottom end view of the improved tool.

Similar numerals refer to similar parts throughout the several views of the drawing.

The main body of the housing indicated at 6 is generally cylindrical and has an enlarged portion 7 at its upper end forming a counterbore, and a curved substantially semi-cylindrical extension 8 at its lower end. A substantially semi-cylindrical guide element 9 is secured to the extension 8, and the guide element 9 preferably overlaps the extension and is welded thereto as indicated at 10. Preferably, the guide element has two arcuate arms 11a and 11b extending laterally inward from its outer end portion.

An elongated cylindrical bearing block 12 is rotatably mounted in the cylindrical housing 6 and is substantially coextensive therewith. The upper end of the block 12 has secured thereto a worm gear 13, as by screws 14, and the worm gear is rotatably mounted in the counterbore in the enlarged portion 7 of the housing. A worm 15 is mounted in the enlarged portion 7 and meshes with the worm gear 13, and the worm is provided with a knurled handle 16 exteriorly of the enlarged portion 7 for turning the worm to rotate the worm gear and with it the bearing block 12.

As indicated in Figs. 3 and 5, the outer configuration of the housing portion 7 is substantially a spiral, with a notch located adjacent to the worm so as to allow manipulation of the handle 16. As shown in Fig. 3, the worm shaft 17 is journaled in the housing portion 7 for rotatably engaging the worm gear, and the outer end of the shaft extends through a lock nut 18 screwed into the housing for holding the worm in position.

The grinding spindle 20 extends through the bearing block 12 out of alignment or at an angle to the axis of said block, and the lower end 21 of the spindle is positioned eccentrically with respect to the block and preferably between the guide arms 11a and 11b. The bottom end 21 of the spindle has an abutment shoulder 22 against which an abrasive grinding wheel 23 is seated by a nut 24 screwed on the threaded end 25 of the spindle. The guide arms 11a and 11b have guide edges 11a' and 11b' at their outer ends and these guide edges, when placed against the interior wall of a cylinder, position the edge of the grinding wheel 23 with respect to the surface of the cylinder.

The spindle 20 is journaled in spaced sleeve bearings in the bearing block 12, the upper end of the spindle being journaled in an upper bearing 26 and the intermediate portion of the spindle being journaled in a lower bearing 27. The upper end of the spindle 20 above the sleeve bearing 26 passes concentrically through the worm gear 13, and has a clevis or bifurcated driving connection member 28 attached thereto. As shown in Fig. 1, the lower sleeve bearing 27 is eccentrically mounted in the bearing block 12 with respect to the worm gear 13, and the upper bearing 26 is aligned with the bearing 27 axially of the spindle so that the spindle 20 is journaled in the bearing block at an angle with the axis of the block, and rotation of the worm gear will rotate the grinding wheel in a circle concentric with the center of the worm gear.

Referring to Fig. 5, when the grinding wheel 23 is adjusted by the worm 15 to its farthest position to the right with respect to the guide edges 11a' and 11b', the guide edges and the edge of the wheel define an arc indicated in dash lines at A which represents the smallest diameter cylinder which can be ground by the tool. When the tool is inserted in a cylinder of that diameter and the guide edges are abutted against the cylinder wall on opposite sides of a spot defect, the wheel 23 cannot grind into the cylinder surface beyond the arc A which is the true circumference of the cylinder.

By adjusting the form 15 to rotate the worm gear 13, the grinding wheel 23 can be rotated inwardly of the guide edges 11a' and 11b' to a position such as indicated by the dot-dash circle 23', in which case the guide edges and the outer edge of the grinding wheel will define a circle such as indicated by the dot-dash line B, which represents a cylinder of larger diameter, so that when the guide points abut a cylinder surface of that diameter, the wheel will accurately grind on a true circle on that diameter.

As shown in Fig. 1, the tool preferably has a cap 30 secured to the upper surface of the housing portion 7 by screws 31. The bottom portion 32 of the cap has a substantially spiral outer configuration to match that of the enlarged housing portion 7, so that the bottom surface of the cap will abut and conform to the top surface of the housing portion 7. Preferably, one or more studs 33 project downwardly from the cap to abut the upper surface of the worm gear and hold it against the bottom of the counterbore in the housing portion 7.

The bottom end of the cap may have a conical counterbore 34 as shown which communicates at its upper end with a bore 35 extending through the top of the cap. Preferably, the sheath 36 of a driving cable is screwed into the lower end of the bore 35 as indicated at 37, and the driving cable 38 has a socket member 39 on its inner end into which the shank 40 of a connector thimble 41 is screwed. The outer end of the thimble 41 preferably has a blade 42 which engages into the clevis 28 of the spindle for making a substantially universal driving connection therewith. The outer end of the cable 38 is arranged in a well-known manner to be driven by power means such as a suitable electrical motor.

In the operation of the novel portable cylinder grinding tool, the lower end of the tool is first inserted into the cylinder to be ground, and the handle 16 of the worm is adjusted to move the grinding wheel 23 in or out until its edge just touches the cylinder wall with the guide edges 11a' and 11b' abutting the cylinder wall. The guide edges are then placed one on each side of the spot defect to be ground, and the driving motor is put in operation while the operator holds the grinding wheel against the spot. As the spot is ground down and the guide edges 11a' and 11b' engage the cylinder wall, the tangential edge of the grinding wheel cannot grind too deeply, but is limited to the true circle defining the interior of the cylinder wall.

Accordingly, the improved portable grinding tool provides for grinding spot defects in cylinder walls without damaging the adjoining surfaces, and the worm adjustment provides for adjusting the position of the grinding tool with respect to the guides, for grinding spots in cylinders of a wide variety of sizes. The elongated bearing block 12 with the spaced bearing sleeves 26 and 27 provides an unusually solid and rigid mounting for the grinding spindle, resulting in increased accuracy in the grinding operation due to lack of vibration of the spindle, and providing for maintaining alignment of the spindle over long periods of use.

The novel portable cylinder grinding tool is simple, compact and inexpensive to manufacture and can be safely used without requiring more than average skill of the operator.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A portable cylinder grinding hand tool having a cylindrical housing, a bearing block rotatably mounted in and substantially coextensive with said housing, means for rotatably adjusting said block in said housing, a power-driven spindle journalled in said block in bearings inclined at an angle to its axis and having an outer projecting end located eccentrically of said housing, a grinding wheel secured on said outer projecting end, and a guide extending longitudinally from one side only of said housing and having a narrow guide element extending laterally from its outer end toward said grinding wheel for positioning the grinding wheel relative to a spot on the inner surface of a cylinder.

2. A portable cylinder grinding hand tool having a housing, a bearing block rotatably mounted in said housing, means for rotatably adjusting said block, a power-driven spindle journalled in said block at an angle to its axis and having one end projecting beyond said block, a grinding wheel on said projecting end of the spindle, and a guide extending longitudinally from one side only of the housing and having a pair of laterally extending guide arms on its outer end straddling said grinding wheel for engaging the inner surface of a cylinder and positioning the grinding wheel relative thereto.

TEBALDO G. POCCI.

REFERENCES CITED

The following references are of record in the file of this patent:

UNITED STATES PATENTS

| Number | Name | Date |
|---|---|---|
| 602,213 | Dyer | Apr. 12, 1898 |
| 844,265 | Dorris | Feb. 12, 1907 |
| 1,093,049 | Hawley | Apr. 14, 1914 |
| 1,197,435 | Bogue | Sept. 5, 1916 |
| 1,425,592 | Jennings | Aug. 15, 1922 |
| 2,011,091 | Steinbauer | Aug. 13, 1935 |
| 2,468,404 | Miller | Apr. 26, 1949 |

FOREIGN PATENTS

| Number | Country | Date |
|---|---|---|
| 18,612 | Great Britain | 1911 |
| 100,754 | Switzerland | Sept. 17, 1923 |